US011010621B2

(12) United States Patent
Doria et al.

(10) Patent No.: US 11,010,621 B2
(45) Date of Patent: May 18, 2021

(54) AUTOMATIC DETECTION AND POSITIONING OF STRUCTURE FACES

(71) Applicant: HERE Global B.V., Eindhoven (NL)

(72) Inventors: David Doria, Oak Park, IL (US); Engin Anil, Mount Prospect, IL (US)

(73) Assignee: HERE Global B.V., Eindhoven (NL)

(*) Notice: Subject to any disclaimer, the term of this patent is extended or adjusted under 35 U.S.C. 154(b) by 225 days.

(21) Appl. No.: 16/210,181

(22) Filed: Dec. 5, 2018

(65) Prior Publication Data

US 2020/0184234 A1 Jun. 11, 2020

(51) Int. Cl.
G06K 9/00 (2006.01)
G06T 7/73 (2017.01)
G01S 17/931 (2020.01)
G01S 17/89 (2020.01)
G05D 1/02 (2020.01)
G06T 7/70 (2017.01)

(52) U.S. Cl.
CPC ......... G06K 9/00805 (2013.01); G01S 17/89 (2013.01); G01S 17/931 (2020.01); G05D 1/024 (2013.01); G05D 1/0248 (2013.01); G06K 9/00798 (2013.01); G06T 7/75 (2017.01); G06T 2207/10028 (2013.01); G06T 2207/30256 (2013.01); G06T 2207/30261 (2013.01)

(58) Field of Classification Search
CPC .... G06K 9/00; G06K 9/0085; G06K 9/00798; G06T 7/75; G06T 2207/10028; G06T 2207/30256; G06T 2207/30261; G01S 17/931; G01S 17/89; G05D 1/0248; G05D 1/024
See application file for complete search history.

(56) References Cited

U.S. PATENT DOCUMENTS

| 8,099,213 | B2 | 1/2012 | Zhang et al. |
| 8,224,097 | B2 | 7/2012 | Matei et al. |
| 8,605,998 | B2 | 12/2013 | James |
| 8,798,372 | B1 | 8/2014 | Korchev et al. |
| 10,078,431 | B1* | 9/2018 | Tolia ................... G06F 3/04847 |
| 2016/0154999 | A1* | 6/2016 | Fan ..................... G06K 9/00201 382/103 |
| 2018/0070527 | A1* | 3/2018 | Richt .................. A01B 79/005 |
| 2020/0075168 | A1* | 3/2020 | Frank .................... G16H 50/20 |

OTHER PUBLICATIONS

Gressin, Adrien, et al. "Towards 3D lidar point cloud registration improvement using optimal neighborhood knowledge." ISPRS journal of photogrammetry and remote sensing 79 (2013): 240-251.

(Continued)

Primary Examiner — Tan Q Nguyen
(74) Attorney, Agent, or Firm — Lempia Summerfield Katz LLC

(57) ABSTRACT

An apparatus and method automatically detects and positions structure faces. After receiving data points describing a geographical area, neighborhoods are defined based on the data points and classified as linear, planar, or volumetric. Neighborhoods are merged into at least one cluster based on local surface normals. At least one bounding frame is fit to the at least one cluster and modified based on a field of interest.

19 Claims, 12 Drawing Sheets

(56) References Cited

OTHER PUBLICATIONS

Mongus, Domen, et al. "Detection of planar points for building extraction from LiDAR data based on differential morphological and attribute profiles." ISPRS Annals of the Photogrammetry, Remote Sensing and Spatial Information Sciences 1 (2013): 21-26.
Nan, Liangliang, and Peter Wonka. "Polyfit: Polygonal surface reconstruction from point clouds." Proceedings of the IEEE Conference on Computer Vision and Pattern Recognition, Venice, Italy. 2017.
Tseng, Yi-Hsing, and Hsiao-Chu Hung. "Extraction of Building Boundary Lines From Airborne Lidar Point Clouds." International Archives of the Photogrammetry, Remote Sensing & Spatial Information Sciences 41 (2016).
Wang, Ruisheng, Frank P. Ferre, and Jane Macfarlane. "A method for detecting windows from mobile LiDAR data." Photogrammetric Engineering & Remote Sensing 78.11 (2012): 1129-1140.
European Search Report for European Patent Application No. 19213518.4—1207 dated Apr. 29, 2020.

* cited by examiner

AUTOMATIC DETECTION AND POSITIONING OF STRUCTURE FACES

FIELD

The following disclosure relates to the automatic detection and positioning of object faces, and more specifically, to planar structural surfaces.

BACKGROUND

Object detection is an important task in computer vision for computers to analyze the world and make reactions. Object detection is applied in automatic driving. Specifically, the detection of structural objects, such as tunnel entrances, building facades, and road signs, are important. Typically, single-pass principal component analysis (PCA) based shape identification is used to detect and position objects. Although PCAs have been demonstrated to be effective on object detection, existing techniques often suffer from inaccurate detection and poor recall of structural objects.

SUMMARY

In one embodiment, a method for automatic detection and positioning of object faces includes receiving, by a processor, a plurality of data points describing a geographical area, defining, by the processor, a plurality of neighborhoods based on the plurality of data points, classifying, by the processor, each of the plurality of neighborhoods as linear, planar, or volumetric, merging, by the processor, at least one neighborhood of the plurality of neighborhoods into one or more clusters based on local surface normals, fitting, by the processor, one or more bounding frames to the one or more clusters, and modifying, by the processor, the one or more bounding frames based on a field of interest.

In one embodiment, a non-transitory computer-readable medium includes instructions that when executed are operable to cause a processor to receive a plurality of point cloud data points describing a geographical area, define a plurality of neighborhoods based on the plurality of point cloud data points, classify each of the plurality of neighborhoods as one of linear, planar, or volumetric, merge at least two neighborhoods of the plurality of neighborhoods into one or more clusters based on local surface normals and a distance threshold, fit one or more bounding frames to the one or more clusters that exceed a size threshold, and modify the one or more bounding frames based on a field of interest.

In one embodiment, an apparatus for automatic detection and positioning of object faces includes an interface module, a calculation module, a cluster module, and an edit module. The interface module is configured to receive a plurality of data points describing a geographical area, wherein the plurality of data points are used to define a plurality of neighborhoods. The calculation module is configured to calculate probabilities of the plurality of neighborhoods as linear, planar, volumetric, or a combination thereof and classify each of the plurality of neighborhoods as linear, planar, or volumetric based on the probabilities. The cluster module configured to merge at least two neighborhoods of the plurality of neighborhoods into one or more clusters based on local surface normals. The edit module configured to fit one or more bounding frames to the one or more clusters that exceed a size threshold and modify the one or more bounding frames based on a field of interest.

BRIEF DESCRIPTION OF THE DRAWINGS

Exemplary embodiments of the present invention are described herein with reference to the following drawings.

DETAILED DESCRIPTION

This following embodiments include methods and processing systems for automatic detection and positioning of structure faces. The structure faces may be part of bridges, signs, tunnel entrances, building facades, road signs, and/or other large flat (i.e. planar) structural surfaces. The following embodiments detect large planar surfaces that are within a predetermined orientation range from the road and within predetermined size limits by collecting data points describing a geographical area from probes from multiple resources as input and, using a detection and positioning processing engine, modeling the planar data points into planar surfaces. In one example, the modeled planar surfaces are used to generate a localization model. The localization model may be provided to a vehicle for localizing the vehicle. In another example, the modeled planar surfaces are applied to a geographic database, which is accessed by a vehicle for obstacle avoidance or an autonomous driving function.

The following embodiments include a novel approach to detect and position structure faces. To begin, data points are classified as being linear, planar, or volumetric according to the distribution of data points in neighborhoods of the data points. The points classified as planar are collected into planar regions. The planar regions that are oriented approximately perpendicular to the road and are within a region of interest of the road are kept. The final representation of the structural faces is a two dimensional (2D) rectangle embedded in three dimensional (3D) data that describes the outer shape of the structural faces. The methodology posited herein allows for better detection and recall of structural objects.

The following embodiments relate to several technological fields including but not limited to navigation, autonomous driving, assisted driving, traffic applications, and other location-based systems. The following embodiments achieve advantages in each of these technologies because an increase in the accuracy of object detection and position improves the effectiveness, efficiency, and speed of specific application in these technologies. In each of the technologies of navigation, autonomous driving, assisted driving, traffic applications, and other location-based systems, identifications of objects in collected images improves the technical performance of the application. In addition, users of navigation, autonomous driving, assisted driving, traffic applications, and other location-based systems are more willing to adopt these systems given the technological advances in object classification.

Figure 1:
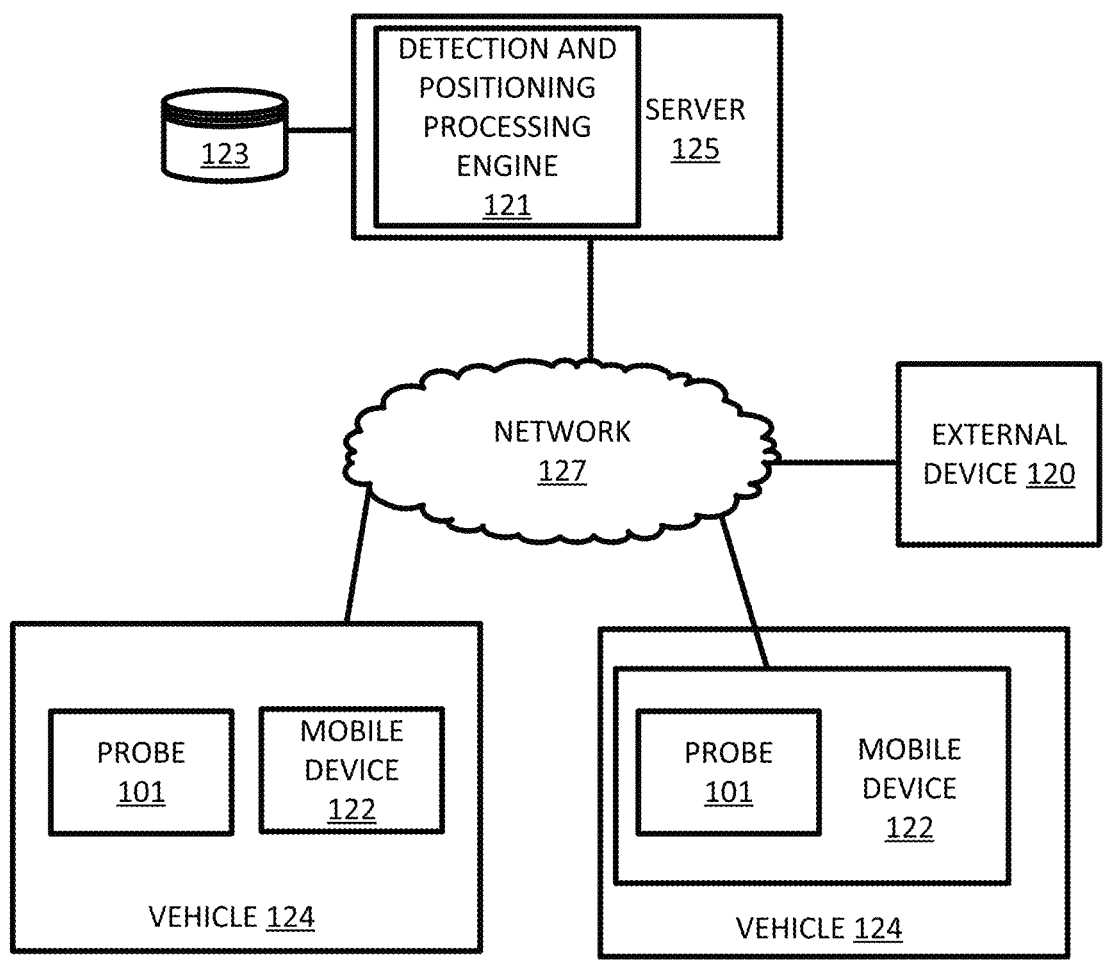
FIG. 1 illustrates an example system for automatic detection and positioning of structure faces.

FIG. 1 illustrates an example system for automatic detection and positioning of structural faces. In FIG. 1, one or more vehicles 124 are connected to the server 125 though the network 127. The vehicles 124 may be directly connected to the server 125 or through an associated mobile device 122. A detection and positioning processing engine 121, including the server 125 and a geographic database 123, exchanges (e.g., receives and sends) data from the vehicles 124. The server 125 may process information data from the vehicles 124. The mobile devices 122 may include local databases corresponding to a local map, which may be modified according to the server 125. The local map may include a subset of the geographic database 123 and are updated or changed as the vehicles 124 travel. The mobile devices 124 may be standalone devices such as smartphones or devices integrated with vehicles. Additional, different, or fewer components may be included.

Each vehicle 124 and/or mobile device 122 may include position circuitry such as one or more processors or circuits for receiving GNSS signals and comparing the GNSS signals to a clock to determine the absolute or relative position of the vehicle 124 and/or mobile device 122. The mobile device 122 may act as probe 101 for determining the position or the mobile device 122 and the probe 101 may be separate devices. The absolute or relative position may be stored as location data. The location data may include geographic coordinates (e.g., longitude and latitude). The location data may include a heading and/or a speed. Alternatively, heading and/or speed may be calculated from a series of points of location data.

The vehicle 124 may include one or more data detection device or sensor, such as a light detection and ranging (LiDAR) device. The data detection sensor may generate point cloud data. The distance data detection sensor may include a laser range finder that rotates a mirror directing a laser to the surroundings or vicinity of the collection vehicle on a roadway or another collection device on any type of pathway. Other types of pathways may be substituted for the roadway in any embodiment described herein.

The detection and positioning processing engine 121 may receive point cloud data from the vehicles 124 to automatically detect and position structural faces. The inputs to the detection and positioning processing engine 121 may include location data such as real time probe data including sensor data received from mobile devices 122 or probe vehicles 124, and map artifact data which describes the road segment topology and geometry. The detection and positioning processing engine 121 is configured to output an estimate of the position of structural faces.

Communication between the vehicles 124 and/or between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, 5G, DSRC (dedicated short range communication), or another protocol. Communication between the vehicles 124 and/or between the mobile device 122 and the server 125 through the network 127 may use data messages over the air radio interface, TPEG service by connected HTTP or UDP protocol, and/or DSRC broadcasting data.

Figure 2:
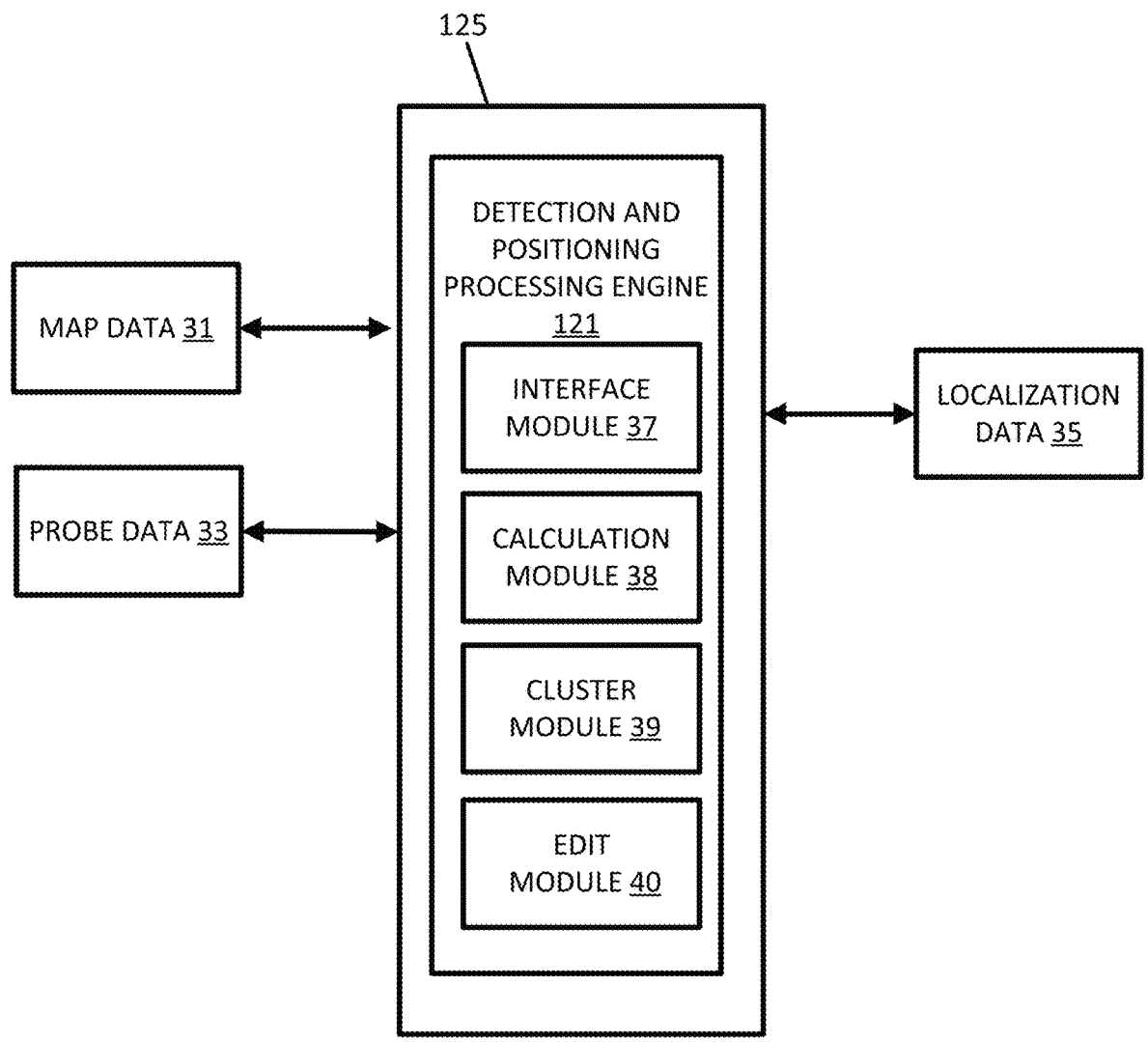
FIG. 2 illustrates an example detection and positioning processing engine from the system of FIG. 1.

FIG. 2 illustrates an example detection and positioning processing engine 121 from the system of FIG. 1. The detection and positioning processing engine 121 may include an interface module 37, a calculation module 38, a cluster module 39, and an edit module 40. The detection and positioning processing engine 121 may include multiple inputs including map data 31 and probe data 33. The detection and positioning processing engine 121 generates localization data 35. Additional, different, or fewer components may be included.

Figure 3:
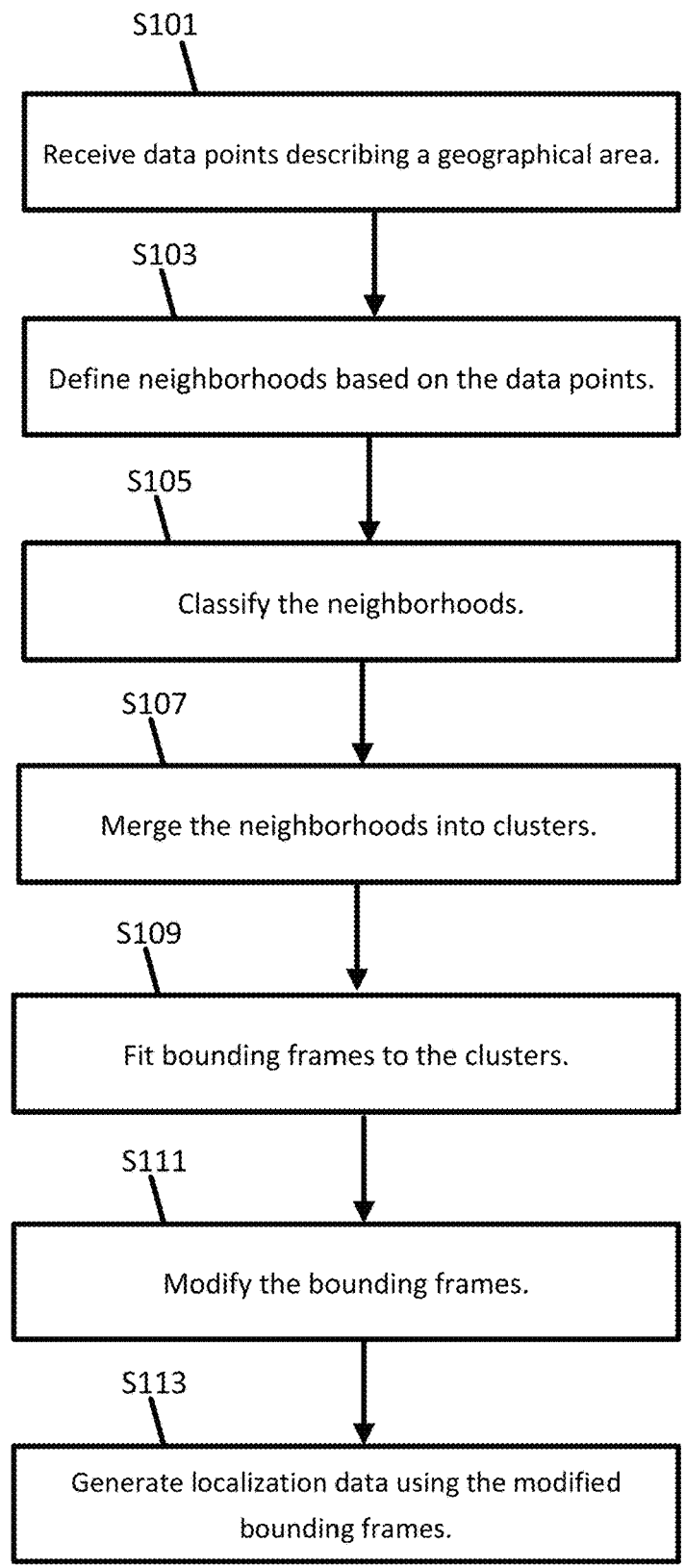
FIG. 3 illustrates an example flowchart for the detection and positioning processing engine from the system of FIG. 1.

FIG. 3 illustrates an example flowchart for the detection and positioning processing engine 121 from the system of FIG. 1 for automatic detection and positioning of structural faces. The acts of the flowchart may be performed by the detection and positioning processing engine 121 or the specific components illustrated in FIG. 2. Additional, different, or fewer acts may be included.

In act S101, the probe data 33 (e.g. data points in a point cloud describing a geographical area) is received at the detection and positioning processing engine 121 by the interface module 37. The probe data 33 may be defined according to three dimensional coordinates. The probe data 33 may be received from one or more sources. The probe data 33 may be detected from sensors such as a camera (e.g., image processing on camera images) or a distance data detection system (e.g., light detection and ranging point cloud). In addition, the detection and positioning processing engine 121 receives map data 31, for example, from the database 123. The map data 31 may include a road lane model. The road lane model may include data for coordinates of the lines of a roadway, such as defining the lanes and boundaries of the roadway. The lines of the roadway may be measures from a center line of the road segment (e.g., distance to lane dividers, distance to lane boundaries, or distance to other lank markers). The road lane model and localization models may be two-dimensional (2D), three-dimensional (3D) or of another dimension n (e.g., n-dimensional (nD), with n>3).

In act S103, the detection and positioning processing engine 121 defines a neighborhood of data points of the probe data 33 by iteratively searching the immediate neighborhood of each data point for the shape with the highest certainty that describes that neighborhood. The neighborhood may be defined by a spatial volume or area. In some examples, the spatial volume is spherical and set by a predetermined radius. Thus, the neighborhood includes the points within the predetermined radius to a starting point. In other examples, the radius is variable and may be iteratively increased until a classification can be made. The radius may be determined using the concept of Shannon entropy for calculating the most descriptive shape in the locality of each point to select the neighborhood radius that corresponds to the lowest entropy. For example, a spherical neighborhood size is based on a 3D point and optimal neighborhood size k (closest 3D points to the 3D point or 3D points within an optimum radius). Three eigenvectors $\lambda_1, \lambda_2, \lambda_3$ (which are discussed in more detail below) are derived to describe the local 3D structure around the 3D point. In this example, the eigenvalues of 3D points within a radius of R around any 3D point are arranged in decreasing order such that $\lambda_1$ is the largest and $\lambda_3$ is the smallest. The linearity of the neighborhood may be defined according to Equation 1:

$$\alpha_1 = \frac{\sqrt{\lambda_1} - \sqrt{\lambda_3}}{\sqrt{\lambda_1}} \quad \text{Eq. 1}$$

The planarity of the neighborhood may be defined according to Equation 2:

$$\alpha_2 = \frac{\sqrt{\lambda_2} - \sqrt{\lambda_3}}{\sqrt{\lambda_1}} \quad \text{Eq. 2}$$

The volumetricity of the neighborhood may be defined according to Equation 3:

$$\alpha_2 = \frac{\sqrt{\lambda_3}}{\sqrt{\lambda_1}} \quad \text{Eq. 3}$$

where $\alpha_1+\alpha_2+\alpha_3=1.0$. These geometric descriptors may be treated as a probability of the neighborhood being linear, planar, or volumetric. The dimensionality of the neighborhood may be defined as the $\alpha_d$ that has the maximum probability. The Shannon entropy function is applied to these probabilities to quantify the uncertainty of the shape of the neighborhood. The lower the entropy, the more certain the dimensionality of the points. The entropy $E_r$ may be calculated according to Equation 4:

$$E_r = -\Sigma_{d=1}^{3}(\alpha_d \ln(\alpha_d)) \quad \text{Eq. 4}$$

Accordingly, the optimal neighborhood size k is selected by minimizing the entropy $E_r$ over varying values for k (i.e., the highest certainty of the neighborhood shape). For example, an iterative algorithm may be used to select the optimum radius for each point that has the lowest entropy:

```
For each point
    Starting with a user selected minimum radius
    Loop over a range of radius values
        Calculate geometric descriptors
        Calculate entropy
    end
    Select the radius with the lowest
    entropy as the optimum radius
end.
```

Once an optimum radius is defined for each point, local geometric descriptors, such as eigenvalues and dimensionality, may be calculated using the optimum radii. These features can be used to segment the point cloud or for classifying objects (which are discussed in more detail below). Additionally or alternatively, the radius may also be limited to a range that correlates with the actual object sizes to be detected and the point densities seen in actual data.

In act S105, the detection and positioning processing engine 121 classifies the neighborhood. Possible classifications of the neighborhood may include linear, planar, or volumetric. The calculation module 38 may select the neighborhood of points and a Bayesian classification algorithm. The classification algorithm may classify the neighborhood of points by determining, through the calculation module 38, the individual probabilities that the neighborhood is linear, planar, and volumetric given the positions of the points in the neighborhood. The neighborhood is classified based on the highest probability. For example, if the probability that the neighborhood is planar is high (e.g., higher than the probability for linear and the probability for volumetric) and the probabilities that the neighborhood is linear and volumetric are low, the neighborhood is classified as planar. In addition, there may be another radius with a lower entropy (i.e., higher probability) for planarity. In this case, the second radius is selected as the optimal radius and the point is classified as planar.

The calculation module 38 may calculate one or more eigenvectors for the points in the neighborhood. First, a covariance matrix is generated for the points in the neighborhood. In the covariance matrix, elements describe the covariance or joint probability of the points in the neighborhood. Positive or greater covariance values indicate similar behavior or correlated behavior between the points in the neighborhood. Negative or lesser covariance values show uncorrelated behavior between the points in the neighborhood. Values in the covariance matrix may be normalized.

From the covariance matrix, eigenvectors are determined for the neighborhood. There may be three eigenvectors for a given radius and/or a given neighborhood. For each point the neighborhood size that minimizes the entropy is selected. Entropy is calculated from pseudo-probabilities of planarity, linearity, volumetricity for each neighborhood size. At the end of this process, for each point, the classification of the point (linear, planar or volumetric), the three vectors (i.e., eigenvectors), and a neighborhood size describes the point. By analyzing a range of neighborhood sizes, the highest probability shape is selected. The values for the eigenvectors may be compared to one or more thresholds to determine whether the neighborhood should be classified as linear, planar, or volumetric.

In one example, the calculation module 38 may increase a radius, from a small radius to a large radius, for the neighborhood. The covariance matrix may be determined from the change in point cloud data between the first radius and the second radius. The eigenvectors are determined for each radius. The orientation of the longest eigenvectors is used to characterize linear neighborhoods. The orientation of the of the smallest eigenvectors is used to characterize planar neighborhoods. The classification of the neighborhood is determined based on the relative magnitude of the eigenvectors. The magnitude of one or more of the smallest eigenvectors may be compared to a planar threshold to classify a planar neighborhood. The magnitude of one or more of the largest eigenvectors may be compared to a linear threshold to classify a linear neighborhood. When neither threshold is met, the calculation module 38 may classify the neighborhood as volumetric (e.g., all neighborhoods in a point cloud are at least volumetric). Subsequently, only points in neighborhoods classified as planar may be considered.

In act S107, the detection and positioning processing engine 121, through the cluster module 39, merges two neighborhoods into a cluster. The merging may be repeated for multiple neighborhoods. The cluster is stored as series of points of the neighborhood. The third eigenvector (e.g., the smallest) is the surface normal of the neighborhood. The points are indexed into a binary tree (e.g., a k-d tree). The points are searched for utilizing the k-d tree. For example, the root of the k-d tree is a single cluster that contains all planar points in the point cloud. Leaves are the single points. An algorithm runs iteratively to perform clustering or merging until all points have been clustered within a threshold distance of each other, with parallel surface normal vectors within an angle threshold, and on a same planar surface.

Accordingly, the points with local surface normals that are parallel within the angle threshold, on the same planar surface, and within the threshold distance from each other are merged into the cluster. Multiple clusters may be formed.

In act S109, the detection and positioning processing engine 121, through the edit module 40 fits a bounding frame to the boundary points cluster. The bounding frame is a specific shape, for example a rectangle, circle, triangle, or another shape. The size of the bounding frame is the smallest possible size that includes all the boundary points of the cluster. For example, the cluster may be fit to a rectangle that most closely represents the cluster. The bounding frames represent detected planar surfaces. The bounding frame may be stored as the minimum amount of points to describe the shape of the bounding frame. For example, if the bounding frame is a rectangle, the four corners of the rectangle are stored as points that represent the bounding rectangle. The edit module 40 may fit the bounding frame by fitting a plane to the data points of the probe data 33 merged into the cluster, projecting the data points onto the plane, and determining the bounding frame based on the projected data points.

Figure 4:
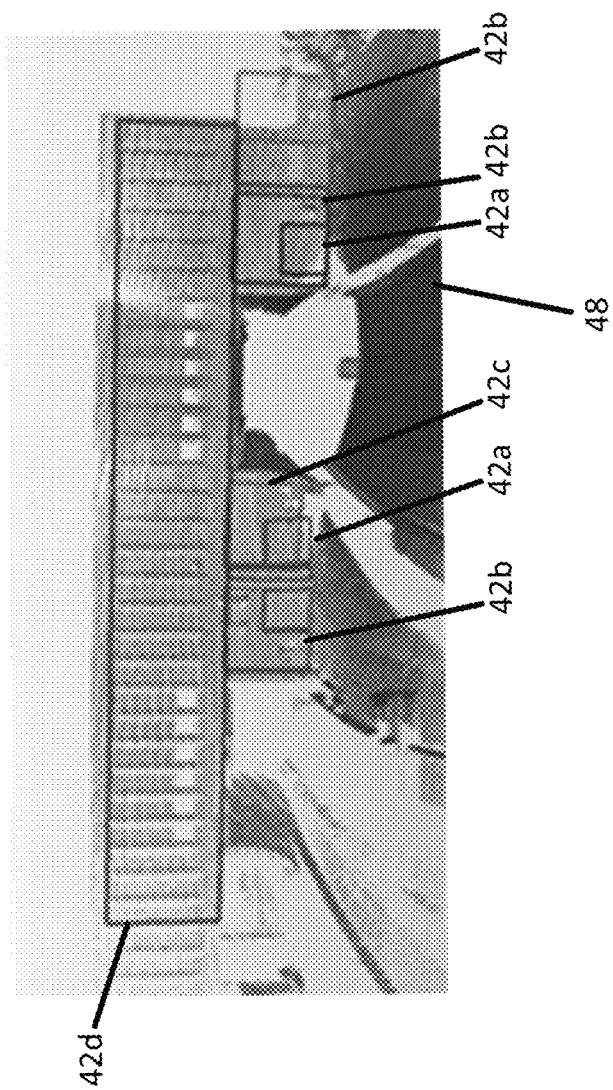
FIG. 4 illustrates an example of bounding frames.

The edit module 40 may be configured to compare the cluster to a size threshold. In this example, the bounding frame is fit to the cluster if the cluster exceed the size threshold. If the cluster is smaller than the size threshold, the cluster is discarded. Accordingly, large flat planar surfaces of bridges, signs, tunnel entrances, building facades, road signs, etc. are detected and represented as bounding frames In one example, multiple rectangular bounding frames are fit to multiple clusters, as shown in FIG. 4. The bounding frames in FIG. 4 are rectangles 42a-d and represent detected planar surfaces on a tunnel entrance.

For localization and obstacle avoidance, only the surfaces closest to a vehicle in a direction of travel are needed when multiple surfaces are detected that are parallel and within a threshold distance from each other. This is because, if the vehicle is going to collide with the rectangular bounding frame 42a in FIG. 4, the vehicle will most likely collide with the rectangular bounding frames 42b and 42c as well. In this case, the surface normals are calculated for each of the rectangular bounding frames 42a-d using, for example, a vector cross product. Further, the distances between the rectangular bounding frames 42a-d are compared. The merging occurs when the rectangular bounding frames 42a-d have parallel surface normals within an angle threshold and are within a threshold distance relative to one another. In this case the rectangular bounding frames 42a-d are combined into a merged rectangle 44, as shown in FIGS. 5 and 6.

Figure 5:
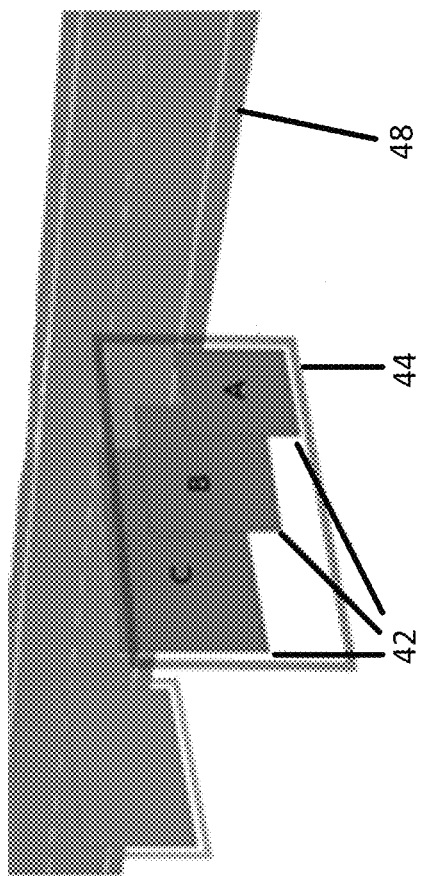
FIG. 5 illustrates an example of merging the bounding frames of FIG. 4.

In FIG. 5, the rectangular bounding frames 42a-c from FIG. 4 are shown being combined into the merged rectangle 44. In this example, the field of interest is a road lane model 48. The rectangular bounding frames 42a-c are candidates to be merged into the merged rectangles 44. In this example, the rectangular bounding frames 42a-c have parallel surface normals within the angle threshold and are within the threshold distance relative to one another. As such, the rectangular bounding frames 42a-c are combined into the merged rectangle 44. In this example, the merged rectangle 44 is on the same plane as the rectangular bounding frame 42a.

Figure 6:
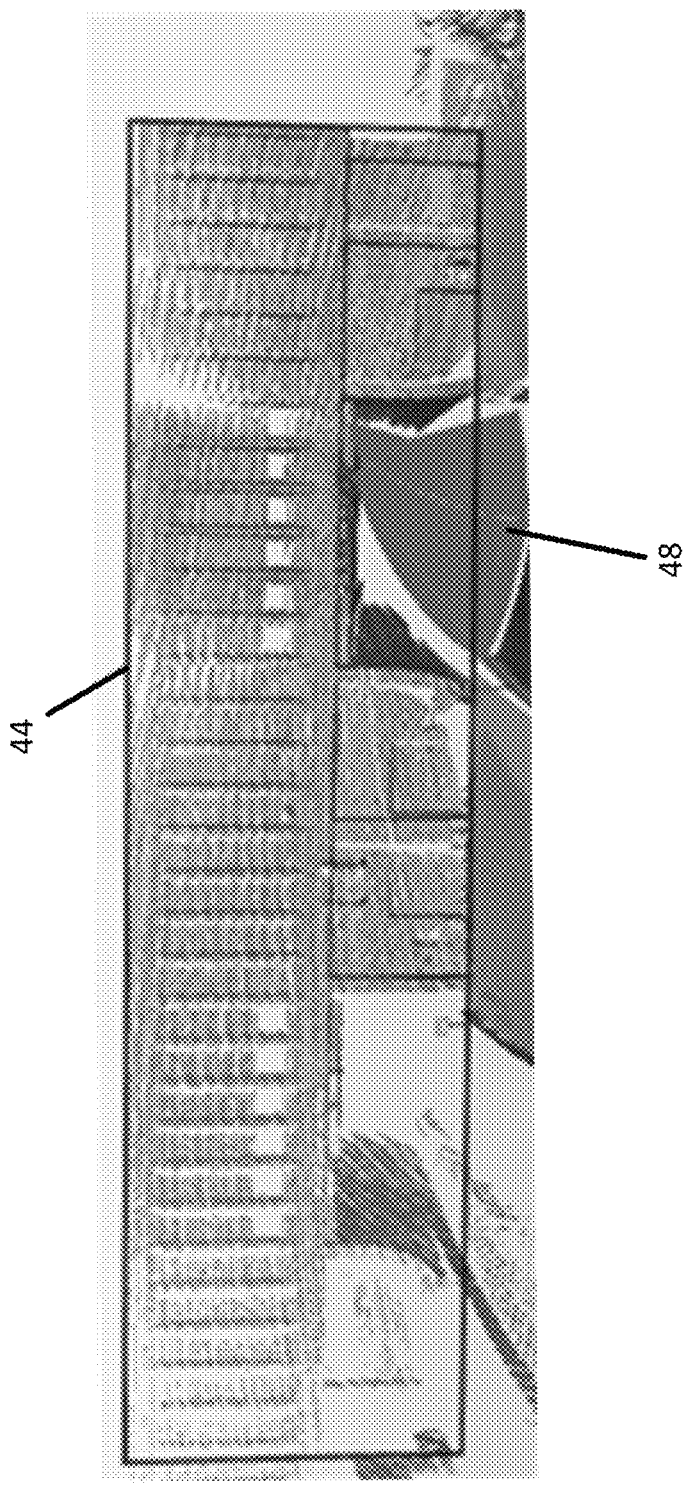
FIG. 6 illustrates an example of a merged bounding frame.

In FIG. 6, the rectangular bounding frames 42a-d from FIG. 4 are shown after combined into the merged rectangle 44. In this example, the rectangular bounding frames 42a-d have parallel surface normals within the angle threshold and are within the threshold distance relative to one another. As such, the rectangular bounding frames 42a-d are combined into the merged rectangle 44. The merged rectangle 44 is at least on the same plane as one of the rectangular bounding frames 42a-d and is intersected by the road lane model 48.

The merged rectangle 44 is fitted such that it is the smallest possible size that includes all the rectangular bounding frames 42a-d. The merged rectangle 44 represents the detected planar surfaces. The merged rectangle 44 may be stored as the minimum amount of points to describe the shape of the merged rectangle 44. In this example, the four corners of the rectangular merged rectangle 44 are stored as points that represent the merged rectangle 44.

Figure 7:
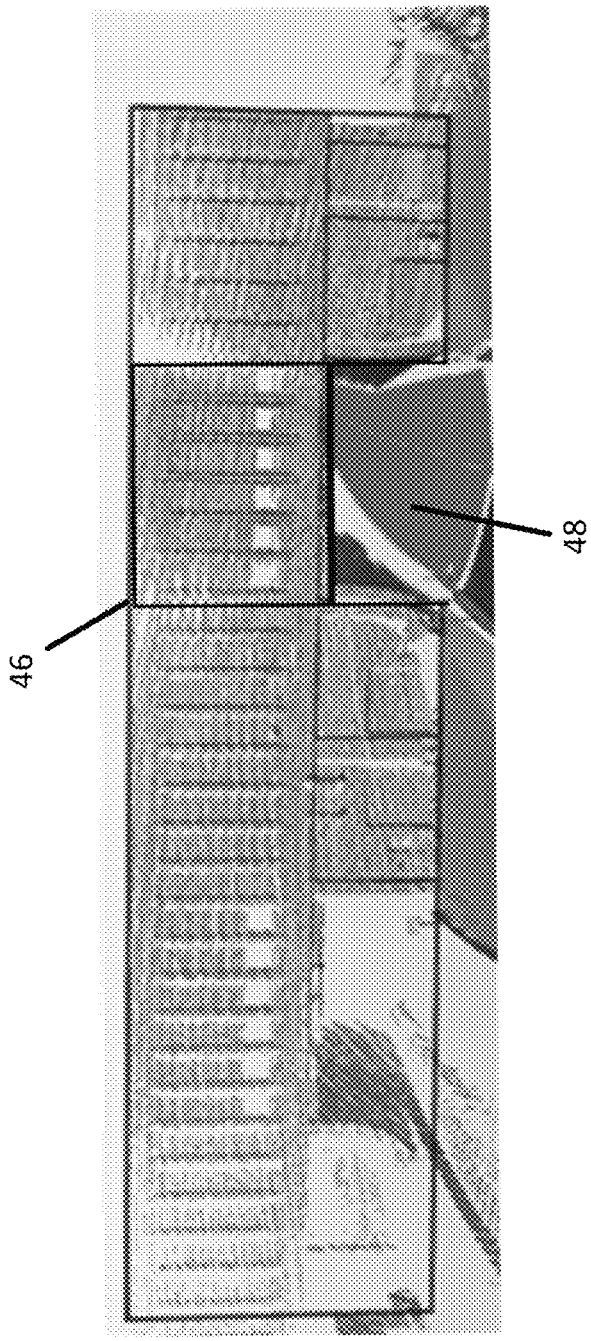
FIG. 7 illustrates an example of a modified merged bounding frame of FIG. 6.

In act S111, the detection and positioning processing engine 121, through the edit module 40 modifies the bounding frame based on a field of interest. In the example shown in FIG. 7, the merged rectangle 44 from FIG. 6 is modified and stored as a modified merged rectangle 46. The merged rectangle 44 is modified by disabling rendering operations within the field of interest. The detection and positioning processing engine 121 may remove a portion for the merged rectangle 44 that corresponds to the field of interest. The detection and positioning processing engine 121 may change the coordinates defining the boundaries of the merged rectangle 44 in order to remove the portion for the field of interest. Accordingly, only the portions of the merged rectangle 44 that are outside of the road lane model 48 are stored as the modified merged rectangle 46. In this example, the field of interest is a road lane model 48. The merged rectangle 44 is modified where the road lane model 48 intersects the merged rectangle 44. In addition, the road lane model 48 may modify the merged rectangle 44 according to a predefined height. The predefined height represents a vehicle height, a known or typical tunnel entrance height, and/or any designated height from a road surface (e.g., 7 feet).

In act S113, the detection and positioning processing engine 121, generates localization data 35 using the modified bounding frames. The localization data may be used for obstacle avoidance, generating localization models, and/or map building. Additionally or alternatively, the detection and positioning processing engine 121 transmits the localization data to the external device 120 and/or the vehicles 124 for obstacle avoidance, generating localization models, and/or map building. Additionally or alternatively, the localization models and/or maps may be provided to an autonomous vehicle for localizing the autonomous vehicle, avoiding an obstacle, and/or autonomous driving.

Figure 8:
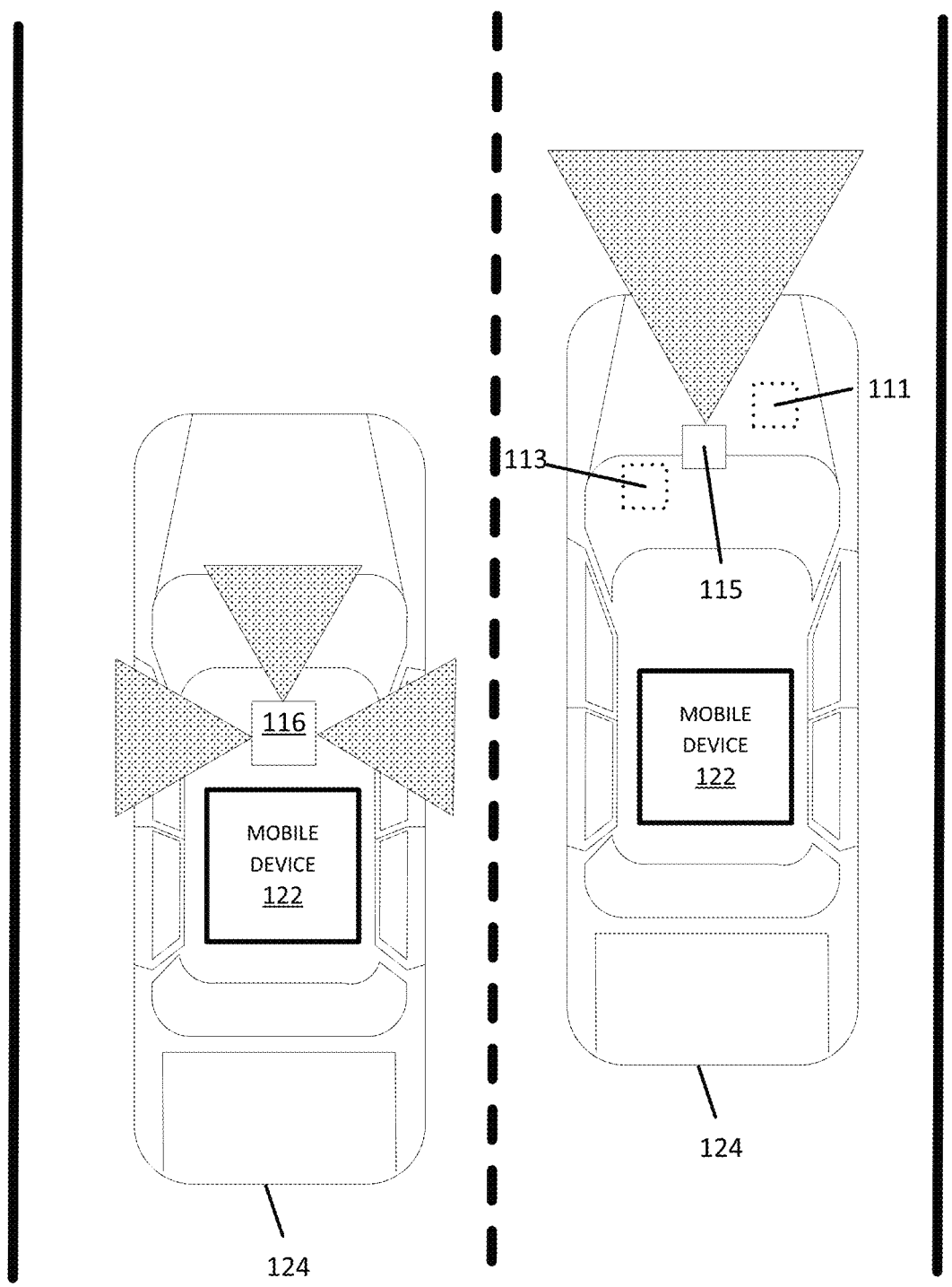
FIG. 8 illustrates an exemplary vehicle of the systems for automatic detection and positioning of structure faces.

FIG. 8 illustrates an exemplary vehicle 124. One of the vehicles 124 may be a collection vehicle configured to collect data in the area proximate to the vehicle 124. The collection vehicle may include one or more distance data collection devices or sensors, such as a light detection and ranging (LIDAR) device. The distance data collection sensor may generate point cloud data. The distance data collection sensor may include a laser range finder that rotates a mirror directing a laser to the surroundings or vicinity of the collection vehicle on a roadway or another collection device on any type of pathway. Other types of pathways may be substituted for the roadway in any embodiment described herein.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle 124. The sensor array may include multiple sensors. Example sensors include an optical distance system 116 such as LiDAR, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

The vehicles 124 may include a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS signal. Alternatively or additionally, the one or more detectors or sensors may include an accelerometer built or embedded into or within the interior of the vehicle 124.

In some alternatives, additional sensors may be included in the vehicle 124. An engine sensor 111 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor.

The automatic detection and positioning of structure faces algorithm is not limited to mobile or vehicle probe data or sensor data. Other kinds of in vehicle data like engine speed, brake sensor event, an acceleration or deacceleration sensor, and/or a camera sensor could also be used as the assistance for detection and positioning of structure faces.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include a memory, a processor, and systems to communicate with the mobile device 122. The assisted driving vehicles may respond to geographic data received from geographic database 123 and the server 125 and driving commands or navigation commands received from the detection and positioning processing engine 121 or generated locally at the vehicle.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to geographic data received from geographic database 123 and the server 125 and driving commands or navigation commands received from the detection and positioning processing engine 121 or generated locally at the vehicle.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to geographic data received from geographic database 123 and the server 125 and driving commands or navigation commands received from the detection and positioning processing engine 121 or generated locally at the vehicle.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on to geographic data received from geographic database 123 and the server 125 and driving commands or navigation commands received from the detection and positioning processing engine 121 or generated locally at the vehicle.

It is worth to note the disclosed embodiments may be applied to any of these HAD or autonomous driving as the safety assistance dynamic content with or without lane level knowledge acknowledged depending on what ADAS applications to be targeted. An autonomous vehicle uses different sensors technologies and HD MAP or dynamic backend content including traffic information services to aid the in vehicles ECM system for the right decision strategy as how to drive along the road network. The autonomy levels may be defined according to the following six levels.

Level 0: Automated system issues warnings and may momentarily intervene but has no sustained vehicle control. Level 1 ("hands on"): The driver and the automated system share control of the vehicle. Examples are Adaptive Cruise Control (ACC), where the driver controls steering and the automated system controls speed; and Parking Assistance, where steering is automated while speed is manual. The driver must be ready to retake full control at any time. Lane Keeping Assistance (LKA) Type II is a further example of level 1 self-driving. Level 2 ("hands off"): The automated system takes full control of the vehicle (accelerating, braking, and steering). The driver must monitor the driving and be prepared to intervene immediately at any time if the automated system fails to respond properly. The shorthand "hands off" is not meant to be taken literally. In fact, contact between hand and wheel is often mandatory during SAE 2 driving, to confirm that the driver is ready to intervene. Level 3 ("eyes off"): The driver can safely turn their attention away from the driving tasks, e.g. the driver can text or watch a movie. The vehicle will handle situations that call for an immediate response, like emergency braking. The driver must still be prepared to intervene within some limited time, specified by the manufacturer, when called upon by the vehicle to do so. When activated by the human driver, the car takes full control of all aspects of driving in slow-moving traffic at up to 60 kilometers per hour. The function works only on highways with a physical barrier separating one stream of traffic from oncoming traffic. Level 4 ("attention off"): As level 3, but no driver attention is ever required for safety, i.e. the driver may safely go to sleep or leave the driver's seat. Self-driving is supported only in limited spatial areas (geofenced) or under special circumstances, like traffic jams. Outside of these areas or circumstances, the vehicle must be able to safely abort the trip, i.e. park the car, if the driver does not retake control. Level 5 ("steering wheel optional"): No human intervention is required.

Figure 9:
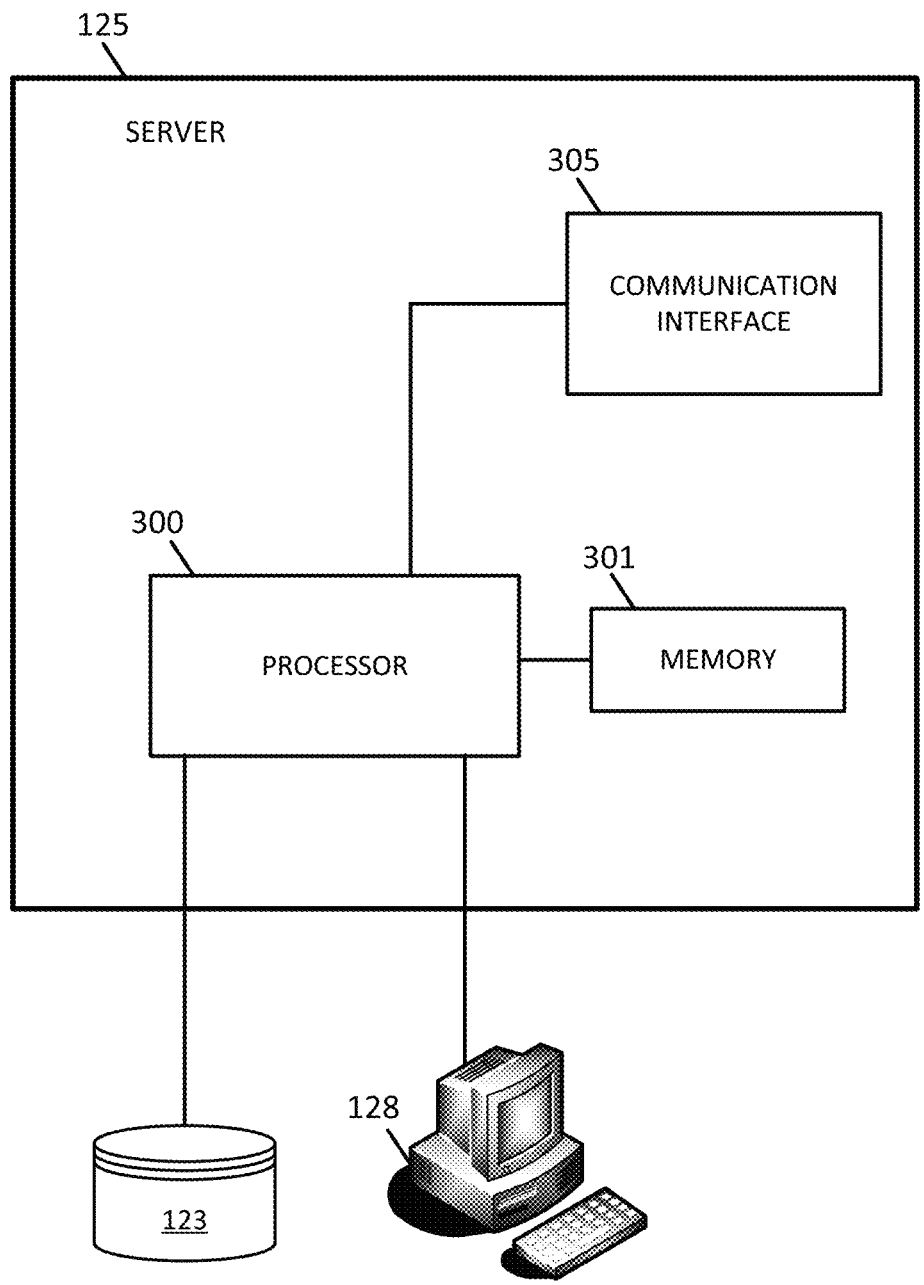
FIG. 9 illustrates an example server.

FIG. 9 illustrates an example server 125, which may apply to the system of FIG. 1. The server 125 includes a processor 300, a communication interface 305, a memory 301, and a database 123. The database 123 may provide map data to the system of FIG. 1 and/or receive localization data that is generated by the system of FIG. 1 via the communication interface 305. An input device 128 (e.g., keyboard or personal computer) may be used to enter settings to the server 125. Additional, different, or fewer components may be provided in the server 125.

Figure 10:
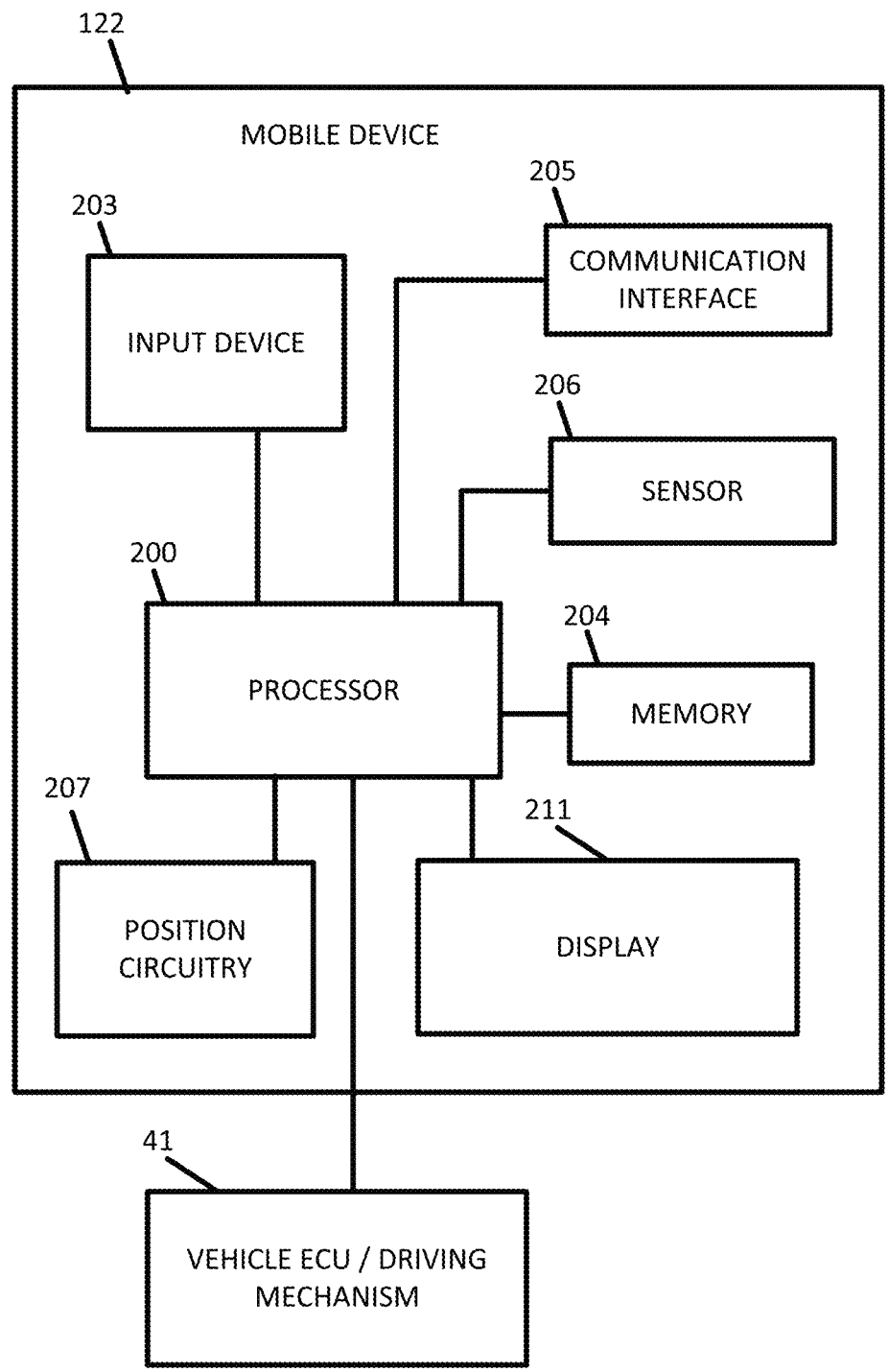
FIG. 10 illustrates an example mobile device.

FIG. 10 illustrates an exemplary mobile device 122 of the system of FIG. 1. The mobile device 122 includes a processor 200, a memory 204, an input device 203, a communication interface 205, position circuitry 207, a distance detector 209, a display 211, and a sensor 206. The input device 203 may receive commands from the user for default settings. The processor 200 may communicate with a vehicle ECU which operates one or more driving mechanisms 41 (e.g., accelerator, brakes, steering device). Alternatively, the mobile device 122 may be the vehicle ECU, which operates the one or more driving mechanisms directly. The sensor 206 may include a camera, a LiDAR device, or another sensor described herein. The sensor 206 may detect large, flat surfaces of objects using the system of FIG. 1. Additional, different, or fewer components are possible for the mobile device 122.

The processor 200 may include a routing module including an application specific module or processor that calculates routing between an origin and destination. The routing module is an example means for generating a routing command based on the localization data. The routing command may be a route from the route to the destination. The routing command may be a driving instruction (e.g., turn left, go straight), which may be presented to a driver or passenger, or sent to an assisted driving system. The display 211 is an example means for displaying the routing command. The mobile device 122 may generate a routing instruction based on the localization data. The routing instructions may be provided by display 211. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device 122 may plan a route through a road system or modify a current route through a road system in response to the request for additional observations of the road object. For example, when the mobile device 122 determines that there are two or more alternatives for the optimum route and one of the routes passes the initial observation point, the mobile device 122 selects the alternative that passes the initial observation point. The mobile devices 122 may compare the optimal route to the closest route that passes the initial observation point. In response, the mobile device 122 may modify the optimal route to pass the initial observation point.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The geographic database 123 may include map data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the map data. The map data may include structured cartographic data or pedestrian routes. The map data may include map features that describe the attributes of the roads and intersections. The map features may include geometric features, restrictions for traveling the roads or intersections, roadway features, or other characteristics of the map that affects how vehicles 124 or mobile device 122 travel through a geographic area. The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle. The geographic database 123 may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle.

The restrictions for traveling the roads or intersections may include turn restrictions, travel direction restrictions, speed limits, lane travel restrictions or other restrictions. Turn restrictions define when a road segment may be traversed onto another adjacent road segment. For example, when a node includes a "no left turn" restriction, vehicles are prohibited from turning left from one road segment to an adjacent road segment. Turn restrictions may also restrict that travel from a particular lane through a node. For example, a left turn lane may be designated so that only left turns (and not traveling straight or turning right) is permitted from the left turn late. Another example of a turn restriction is a "no U-turn" restriction.

Travel direction restriction designate the direction of travel on a road segment or a lane of the road segment. The travel direction restriction may designate a cardinal direction (e.g., north, southwest, etc.) or may designate a direction from one node to another node. The roadway features may include the number of lanes, the width of the lanes, the functional classification of the road, or other features that describe the road represented by the road segment. The functional classifications of roads may include different levels accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

Figure 11:
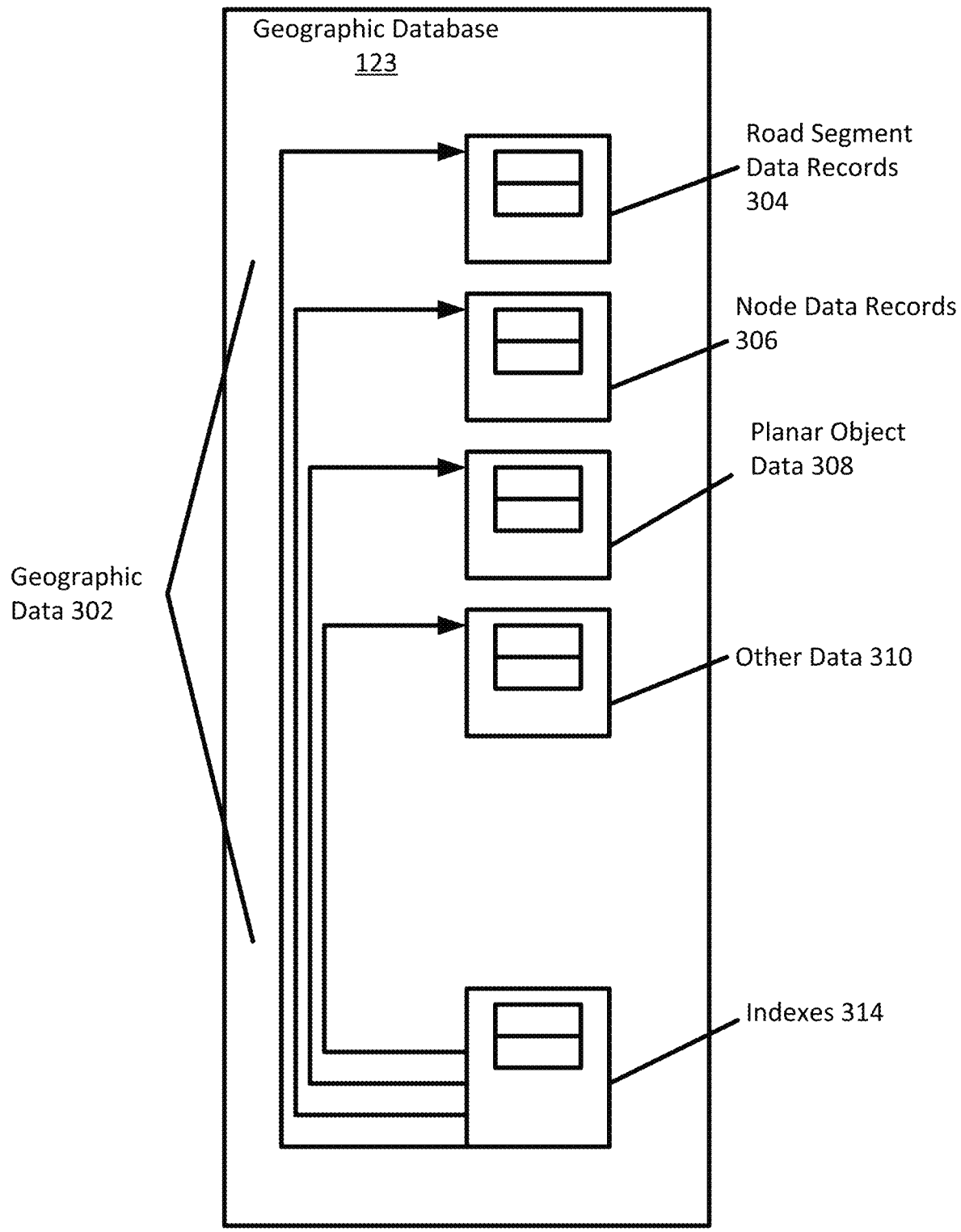
FIGS. 11 and 12 illustrate example geographic databases.

In FIG. 11, the geographic database 123 may contain at least one road segment database record 304 (also referred to as "entity" or "entry") for each road segment in a particular geographic region. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include other kinds of data 310. The other kinds of data 310 may represent other kinds of geographic features or anything else. The other kinds of data may include POI data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

As another example, the indexes 314 may relate planar object data 308 (e.g., for a tunnel entrance) with a road segment in the segment data records 304 or a geographic coordinate. An index 314 may, for example, store planar object data 308 relating to one or more signs that have been identified.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 may include temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

Figure 12:
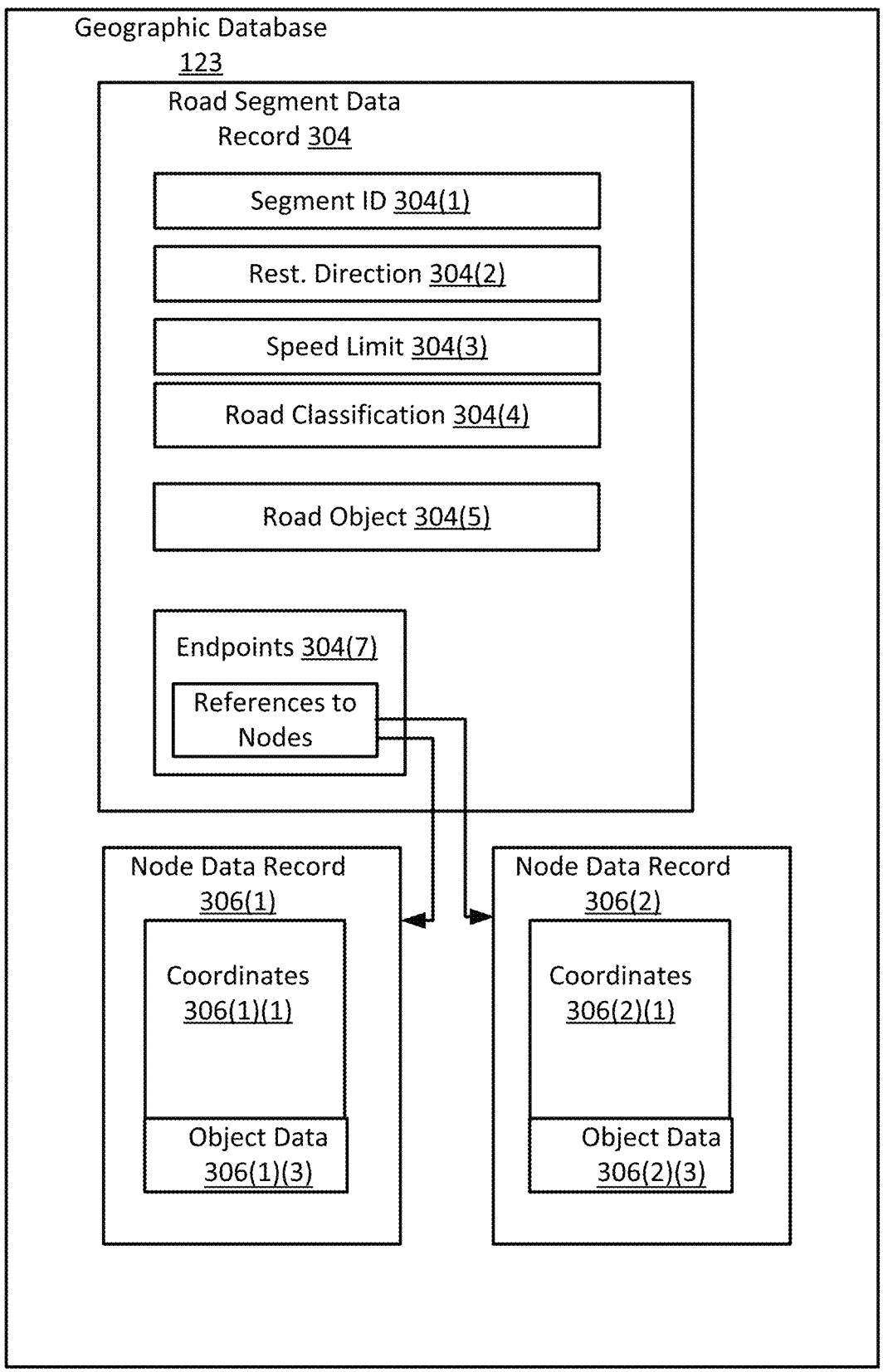

FIG. 12 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 304 (or data entities) that describe features such as road objects 304(5). The road objects 304(5) may be stored according to location boundaries or vertices. The road objects 304(5) may be stored as a field or record using a scale of values such as from 1 to 100 for type or size.

The road objects may be objects in the road or in the vicinity of the road. The road objects may be stored with a classification field according to the planar object data. Additional schema may be used to describe the road objects. The attribute data may be stored in relation to a link/segment 304, a node 306, a strand of links, a location fingerprint, an area, or a region. The geographic database 123 may store information or settings for display preferences. The geographic database 123 may be coupled to a display. The display may be configured to display the roadway network and data entities using different colors or schemes.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 12 also shows some of the components of a node data record 306 that may be contained in the geographic database 123. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306 (1)(1) and 306(2)(1) for their node. The node data records 306(1) and 306(2) may also include object data 306(1)(3) and 306(2)(3) that refer to various other attributes of the nodes. For example, planar object data.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used. The database 123 may be incorporated in or connected to the server 125.

The geographic database 123 and the data stored within the geographic database 123 may be licensed or delivered on-demand. Other navigational services or traffic server providers may access the location fingerprint data, traffic data and/or the lane line object data stored in the geographic database 123.

The processor 200 and/or processor 300 may include a general processor, digital signal processor, an application specific integrated circuit (ASIC), field programmable gate array (FPGA), analog circuit, digital circuit, combinations thereof, or other now known or later developed processor. The processor 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface of the display 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments are also disclosed:

Embodiment 1

A computer implemented method for automatic detection and positioning of object faces, the method comprising:
  receiving, by a processor, a plurality of data points describing a geographical area;
  defining, by the processor, a plurality of neighborhoods based on the plurality of data points;
  classifying, by the processor, each of the plurality of neighborhoods as linear, planar, or volumetric;
  merging, by the processor, at least one neighborhood of the plurality of neighborhoods into one or more clusters based on local surface normals;
  fitting, by the processor, one or more bounding frames to the one or more clusters; and
  modifying, by the processor, the one or more bounding frames based on a field of interest.

Embodiment 2

The method of embodiment 1, wherein the plurality of data points are produced by a light detection and ranging (LIDAR) device.

Embodiment 3

The method of embodiment 1 or 2, further comprising:
  calculating, by the processor, a probability that the plurality of neighborhoods is linear, a probability that the plurality of neighborhoods is planar, or a probability that the plurality of neighborhoods is volumetric.

Embodiment 4

The method of any of embodiments 1 to 3, further comprising:
  calculating, by the processor, one or more eigenvector values for the at least one of the plurality of neighborhoods.

Embodiment 5

The method of any of embodiments 1 to 4, further comprising:
  comparing the one or more eigenvector values to a threshold,
  wherein the classifying is based on the comparison of the one or more eigenvector values to the threshold.

Embodiment 6

The method of any of embodiments 1 to 5, wherein the one or more eigenvector values are calculated using a covariance matrix.

Embodiment 7

The method of any of embodiments 1 to 6, wherein at least two of the plurality neighborhoods classified as planar are merged into the one or more clusters.

Embodiment 8

The method of any of embodiments 1 to 7, wherein the merging occurs when the at least two of the plurality neighborhoods are within a threshold distance and have parallel local surface normals.

Embodiment 9

The method of any of embodiments 1 to 8, wherein the plurality of neighborhoods are sized in a range that correlates with a size of the object faces, a density of the plurality of data points, or a combination thereof.

Embodiment 10

The method of any of embodiments 1 to 9, further comprising:
  comparing, by the processor, the one or more clusters to a size threshold, wherein the one or more bounding frames are fit to the one or more clusters that are larger than the size threshold.

Embodiment 11

The method of any of embodiments 1 to 10, wherein the fitting comprises:
  fitting a plane to the data points merged in the one or more clusters;
  projecting the data points onto the plane; and
  determining the one or more bounding frames based on the projected data points.

Embodiment 12

The method of any of embodiments 1 to 11, wherein the one or more bounding frames comprise at least two bounding frames that are merged when the at least two bounding frames comprise parallel surface normals relative to each other and are within a threshold distance from each other.

Embodiment 13

The method of any of embodiments 1 to 12, wherein the modifying comprises removing a portion of the one or more bounding frames that is within the field of interest.

Embodiment 14

The method of any of embodiments 1 to 13, wherein the field of interest comprises a road lane model.

Embodiment 15

The method of any of embodiments 1 to 14, further comprising:
generating, by the processor, a localization model using the modified one or more bounding frames and the plurality of data points; and
providing, by the processor, the localization model to an autonomous vehicle for localizing the autonomous vehicle.

Embodiment 16

The method of any of embodiments 1 to 15, wherein the object faces are part of a tunnel entrance, a building facade, a sign, or a combination thereof.

Embodiment 17

The method of any of embodiments 1 to 16, wherein the one or more bounding frames are rectangles.

Embodiment 18

An apparatus, configured to perform and/or control the method of any of embodiments 1-17 or comprising means for performing and/or controlling any of embodiments 1-17.

Embodiment 19

An apparatus, comprising at least one processor and at least one memory including computer program code for one or more programs, the at least one memory and the computer program code configured to, with the at least one processor, to perform and/or control the method of any of embodiments 1-17.

Embodiment 20

A computer program comprising instructions operable to cause a processor to perform and/or control the method of any of embodiments 1-17, when the computer program is executed on the processor.

The invention claimed is:

1. A computer implemented method for automatic detection and positioning of object faces, the method comprising:
receiving, by a processor, a plurality of data points describing a geographical area;
defining, by the processor, a plurality of neighborhoods based on the plurality of data points;
calculating, by the processor, a probability that the plurality of neighborhoods is linear, a probability that the plurality of neighborhoods is planar, or a probability that the plurality of neighborhoods is volumetric;
classifying, by the processor, each of the plurality of neighborhoods as linear, planar, or volumetric based on a highest probability among or a higher probability between the calculated probabilities;
merging, by the processor, at least one neighborhood of the plurality of neighborhoods into one or more clusters based on local surface normals;
fitting, by the processor, one or more bounding frames to the one or more clusters; and
modifying, by the processor, the one or more bounding frames based on a field of interest.

2. The method of claim 1, wherein the plurality of data points are produced by a light detection and ranging (LIDAR) device.

3. The method of claim 1, further comprising:
calculating, by the processor, one or more eigenvector values for the at least one of the plurality of neighborhoods.

4. The method of claim 3, further comprising:
comparing the one or more eigenvector values to a threshold,
wherein the classifying is based on the comparison of the one or more eigenvector values to the threshold.

5. The method of claim 3, wherein the one or more eigenvector values are calculated using a covariance matrix.

6. The method of claim 1, wherein at least two of the plurality neighborhoods classified as planar are merged into the one or more clusters.

7. The method of claim 6, wherein the merging occurs when the at least two of the plurality neighborhoods are within a threshold distance and have parallel local surface normals.

8. The method of claim 1, wherein the plurality of neighborhoods are sized in a range that correlates with a size of the object faces, a density of the plurality of data points, or a combination thereof.

9. The method of claim 1 further comprising:
comparing, by the processor, the one or more clusters to a size threshold, wherein the one or more bounding frames are fit to the one or more clusters that are larger than the size threshold.

10. The method of claim 1, wherein the fitting comprises:
fitting a plane to the data points merged in the one or more clusters;
projecting the data points onto the plane; and
determining the one or more bounding frames based on the projected data points.

11. The method of claim 1, wherein the one or more bounding frames comprise at least two bounding frames that are merged when the at least two bounding frames comprise parallel surface normals relative to each other and are within a threshold distance from each other.

12. The method of claim 1, wherein the modifying comprises removing a portion of the one or more bounding frames that is within the field of interest.

13. The method of claim 1, wherein the field of interest comprises a road lane model.

14. The method of claim 1 further comprising:
generating, by the processor, a localization model using the modified one or more bounding frames and the plurality of data points; and
providing, by the processor, the localization model to an autonomous vehicle for localizing the autonomous vehicle.

15. The method of claim 1, wherein the object faces are part of a tunnel entrance, a building facade, a sign, or a combination thereof.

16. The method of claim 1, wherein the one or more bounding frames are rectangles.

17. A non-transitory computer-readable medium including instructions that when executed are operable to cause a processor to:
receive a plurality of point cloud data points describing a geographical area;
define a plurality of neighborhoods based on the plurality of point cloud data points;

calculate a probability that the plurality of neighborhoods is linear, a probability that the plurality of neighborhoods is planar, or a probability that the plurality of neighborhoods is volumetric;

classify each of the plurality of neighborhoods as one of linear, planar, or volumetric based on a highest probability among or a higher probability between the calculated probabilities;

merge at least two neighborhoods of the plurality of neighborhoods into one or more clusters based on local surface normals and a distance threshold;

fit one or more bounding frames to the one or more clusters that exceed a size threshold; and modify the one or more bounding frames based on a field of interest.

18. An apparatus for automatic detection and positioning of object faces, the apparatus comprising:

an interface module configured to receive a plurality of data points describing a geographical area, wherein the plurality of data points are used to define a plurality of neighborhoods;

a calculation module configured to calculate probabilities of the plurality of neighborhoods as linear, planar, volumetric, or a combination thereof and classify each of the plurality of neighborhoods as linear, planar, or volumetric based on a highest probability among or a higher probability between the calculated probabilities;

a cluster module configured to merge at least two neighborhoods of the plurality of neighborhoods into one or more clusters based on local surface normals; and an edit module configured to fit one or more bounding frames to the one or more clusters that exceed a size threshold and modify the one or more bounding frames based on a field of interest.

19. The apparatus of claim 18, wherein the edit module adjusts coordinates for the one or more bounding frames to remove a portion that is within the field of interest.

* * * * *